United States Patent
Ziegler et al.

(10) Patent No.: US 6,813,012 B2
(45) Date of Patent: Nov. 2, 2004

(54) OPTICAL MEASURING OR TESTING DEVICE WITH CONNECTION ELEMENT

(75) Inventors: Jochen Ziegler, Stuttgart (DE); Peter Frank Schweiger, Mississauga (CA); Alf Clement, Aidlingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 253 days.

(21) Appl. No.: 10/072,198

(22) Filed: Feb. 7, 2002

(65) Prior Publication Data

US 2002/0122170 A1 Sep. 5, 2002

(30) Foreign Application Priority Data

Feb. 10, 2001 (DE) .......................... 101 06 137

(51) Int. Cl.⁷ ............................................. G01N 21/00
(52) U.S. Cl. ....................................... 356/73.1
(58) Field of Search ................. 356/73.1; 324/522–527, 324/532–535, 541–551; 379/24–32; 370/241, 248, 484

(56) References Cited

U.S. PATENT DOCUMENTS 5,066,118 A    11/1991   Buerli .................... 356/73.1
6,653,844 B2 * 11/2003   Wyar ..................... 324/533

* cited by examiner

Primary Examiner—Tu T. Nguyen

(57) ABSTRACT

A device for measuring and testing components of optical networks includes an optical connector over which an optical cable may be optically connected to the device's measuring and/or testing equipment; wherein a first connector element is provided, onto which a complimentary second connector element, attached to the optical cable or to this connectable adapter, may be connected to form an optical coupling; wherein the first connector element is attached to one end of the tubular connection elements, which is connected at its other end to the connector and is reversibly and three-dimensionally flexible.

15 Claims, 3 Drawing Sheets

OPTICAL MEASURING OR TESTING DEVICE WITH CONNECTION ELEMENT

BACKGROUND OF THE INVENTION

Devices for measuring or testing components of optical networks are used, for example, to test or measure the performance or function of a component, e.g. wiring and/or components of an optical network. For such testing or measurement, the component to be tested must be connected to the device's measuring and/or testing equipment with an optical cable to create an optical connection. For this purpose, the device features an optical connector. Such devices exist in the Agilent E6000 series from Agilent Technologies or under U.S. Pat. No. 5,066,118, for example.

SUMMARY OF THE INVENTION

The problem of the present invention is to simplify the attachment and detachment of an optical connection between the connector and an optical cable for the above-mentioned type of device. This problem will be solved by the characteristics of the independent claims. Advantageous embodiments are stated in the dependent claims.

The invention is based on the concept of connecting or constructing onto the connector on the side of the equipment a connecting piece in the form of a tubular connection element, the free end of which may be used to configure an optical coupling with a cable. For this purpose, the connection element has at its free end a first connector element that is installed complimentary to a second connector element, which features the optical cable to be connected to it. The tubular connection element is reversibly and three-dimensionally flexible, such that the first connector element attached to its free end may be positioned in virtually any way. Through this configuration, the first connector element can be configured regularly in conjunction with an appropriate length for the connection element, such that sufficient space is available for the manual attachment or detachment of an optical coupling between the cable and the connection element. For example, the first connector element may be positioned on a suitable point on the front side of the device through appropriate flexing of the connection element in order to attach the optical coupling, while the connection element leads to the connector on the back of the device. This considerably simplifies the handling of the device, as a multitude of different cables may be connected in succession to the connection element, and thus to the connector on the device.

More usefully, the connection element according to the invention has a protective function over the connector on the device, which is sensitive to dirt or touch. Frequent attachment and detachment of the optical connection between the cable and the device can result in wear of the connection element, which is considerably less expensive to replace than the permanent connector on the device.

It is obvious that the order of magnitude of the flexibility of the connection element according to the invention differs considerably from the flexibility of an essentially rigid body, wherein the flexibility is due to its material elasticity. In particular, the connection element must be sufficiently flexible, such that an angle of at least 45°, preferably more than 60° or more than 90°, may be set between the ends of the tubular connection element.

According to an especially advantageous embodiment, the connection element can be configured, such that it essentially retains a three-dimensional form set by reversible bending. This means that the connection element maintains the attained geometry set by the user. The thus positioned first connector element is therefore constantly accessible. Tubular elements with such properties are, for example, found in desk lamps, of which the shade is joined over such an element with a support rack. Due to this element's flexibility, the lampshade can be adjusted or positioned for optimal lighting. The invention is clearly not limited to connection elements, which are already found in lamps and lights.

The connection element can be securely connected to the device's optical connector, wherein an embodiment is selected in which the connection element may be retracted into the device. A space-saving lodging is thus created, also forming protection for the connection element in transit.

Through one particular embodiment, the connection element can be detachably secured onto the equipment's connector with a couplant. This couplant, attached between the connector and the connection element, is effectively identical to the connector element between the connection element and the cable. Through this, it is possible on one hand to connect the cable either indirectly over the connection element or directly into the connector. The connection element can then be set as required. On the other hand, a conventional device can also be upgraded with such a connection element in this embodiment in order to configure the device according to the invention.

There are many different variations for the connecting links that are securely attached to the cable. In order for these various connecting links to be attached to the connector on the device, adapters are available, which on one hand may be attached to the connector on the side of the device, or on other hand to the respective variation of the connecting links on the cable side. Such an adapter is provided for each variation of connecting links on the cable side. The connection element according to the invention may also be configured as such an adapter, meaning that a suitable connection element is in position for each variant of the possible connecting links on the side of the cable as well as for the second connector element. It is however more effective to use the existing adapter, where the respective suitable adapter is fitted between the connection element and the cable that connects to it.

BRIEF DESCRIPTION OF THE DRAWINGS

The following gives a further description of the invention with reference to the drawings, wherein the same reference marks refer to identical, functionally identical, or similar features. It is shown schematically in FIG. 1 a perspective view of the device according to the invention, FIG. 2 an enlarged detailed view of the device as in FIG. 1 with attachment and detachment of the cable, FIG. 3 a perspective view of the connection element according to the invention, FIG. 4 a view as in FIG. 2, but with a device equipped with the connection element according to the invention with attachment and detachment of the cable,

DETAILED DESCRIPTION OF THE DRAWINGS

Figure 1:
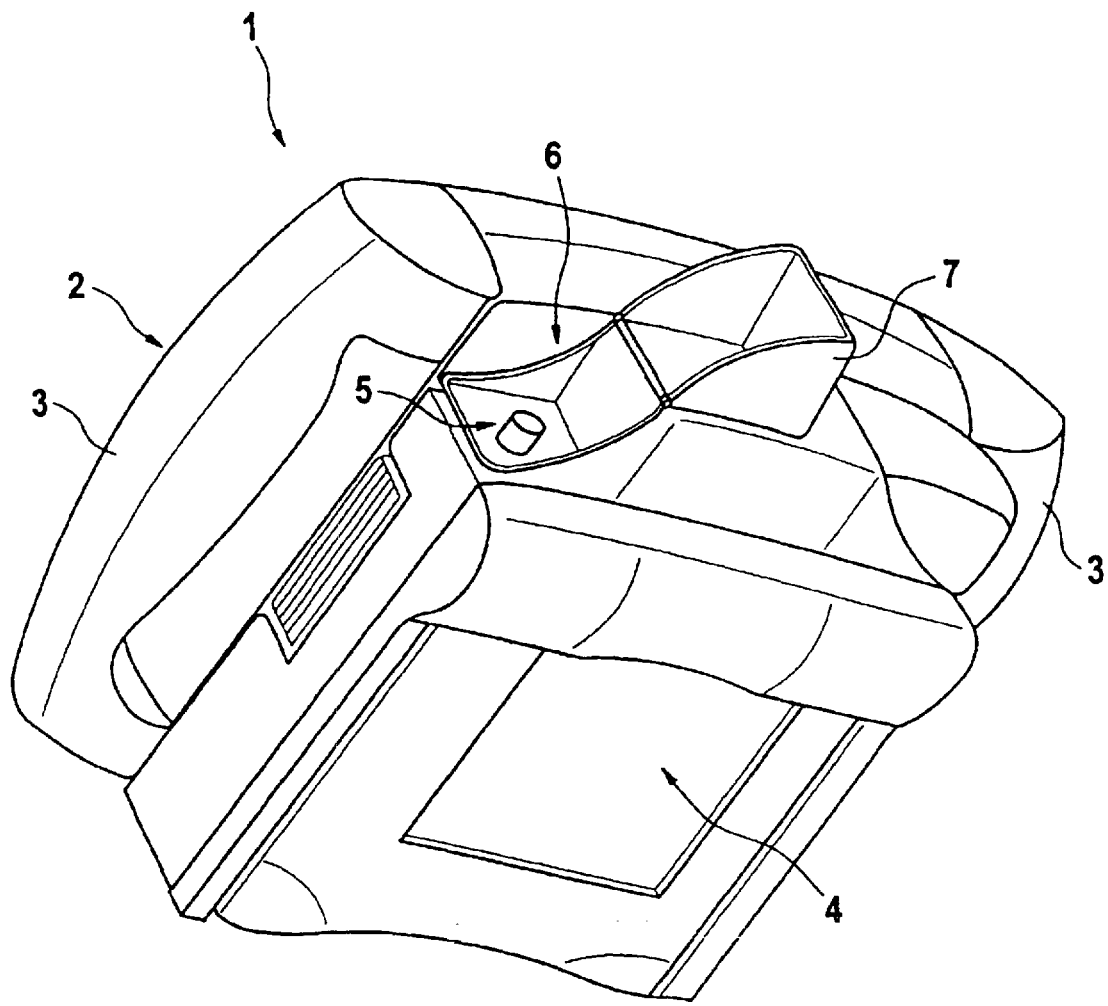

According to FIG. 1, the device 1 has a casing 2, which has handles 3 on either side. What is shown in this embodiment here is a portable embodiment for the device 1. The invention is also adaptable for use with a stationary device 1. The device 1 may comprise an electrical time domain reflectometer (TDR), or may be configured as such, which is used to characterize/measure an electrical cable, such as a co-axial transmission cable, telephone cable, or other supply such as piping. The device 1 may equally comprise an optical time domain reflectometer (OTDR), or may be configured as such, which is used to characterize/measure the attenuation, homogeneity, splice waste, interruptions, the length, or the like of an optical fiber. Furthermore, the equipment 1 may comprise a wavelength division multiplexing (WDM) testing device, or may be configured as such, which can be used to characterize/measure wavelength division multiplexing signals.

The device 1 contains measuring and/or test equipment that is not visible here. These usually contain a programmed, or programmable, computer and storage medium. The measuring and/or test equipment is installed to carry out measurement and/or test procedures and tasks, with which optical networks or individual optical network components, more particularly optical components and wiring such as fiber-optic cables, may be tested and measured. The device 1 has regular control devices on its front at the far side from the viewer as well as a display device in LCD display form. On the reverse side 4 nearest to the viewer, there is an optical connector 5 installed on the device 1 in the side corner above. This is optically connected to the above-mentioned measuring and/or test equipment in the device 1. A recess 6, which can be sealed by means of a protective cap 7, is built into the casing 2 to arrange with the connector 5. In FIG. 1, this protective cap 7 is open. The protective cap 7 can be snapped closed in order to protect the connector 5, thus concealing the recess 6 and the connector 5. The recess 6 thus provides a foldaway position for the connector 5.

Figure 2:
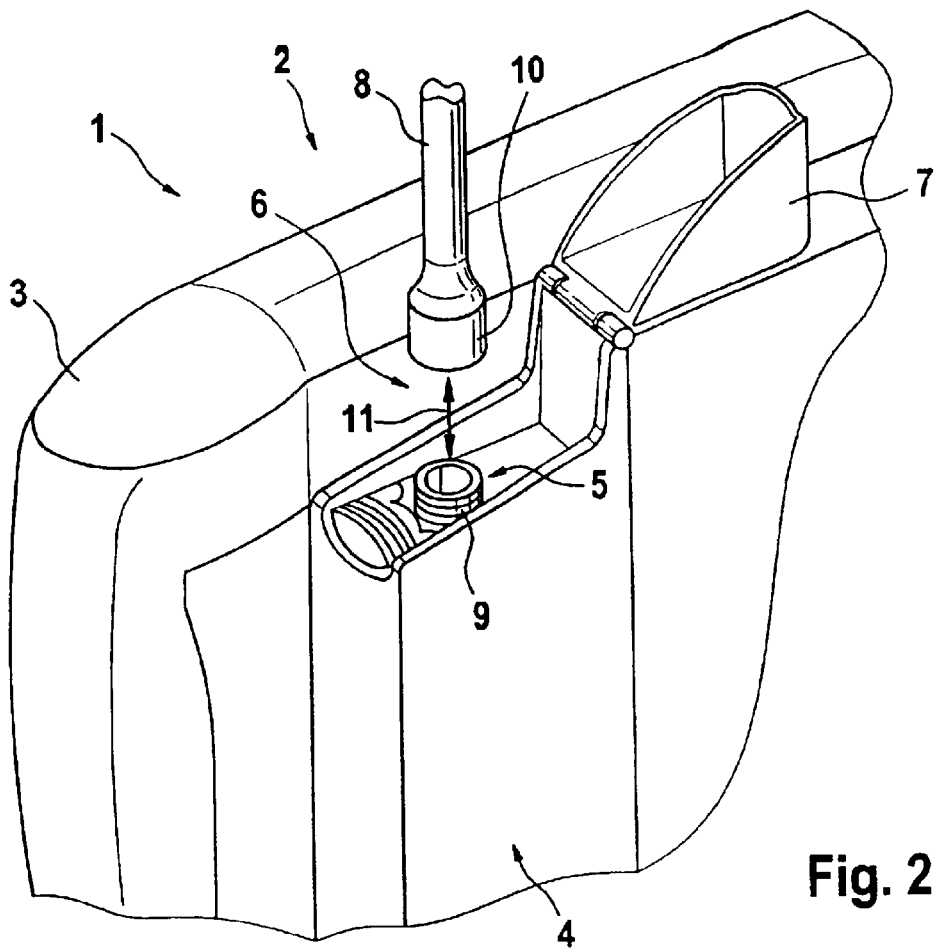

In FIG. 2, an optical cable 8, to be measured or tested by the device 1, or one, which leads to an optical component to be measured or tested by the device 1, may be joined to the connector 5. A first coupling element 9 is attached to the connector 5 to establish an optical coupling between the connector 5 and the cable 8. At the end to be connected, the latter features a second connector element 10, which is complimentary to the first coupling element 9. This first coupling element 9 and the second connector element 10 are mainly designed to form a combined socket and/or screw connection, which allows for the detachable connection of the cable 8 to the connector 5. The attachment and detachment of this optical coupling is marked symbolically in FIG. 2 with a double arrow 11.

Figure 4:
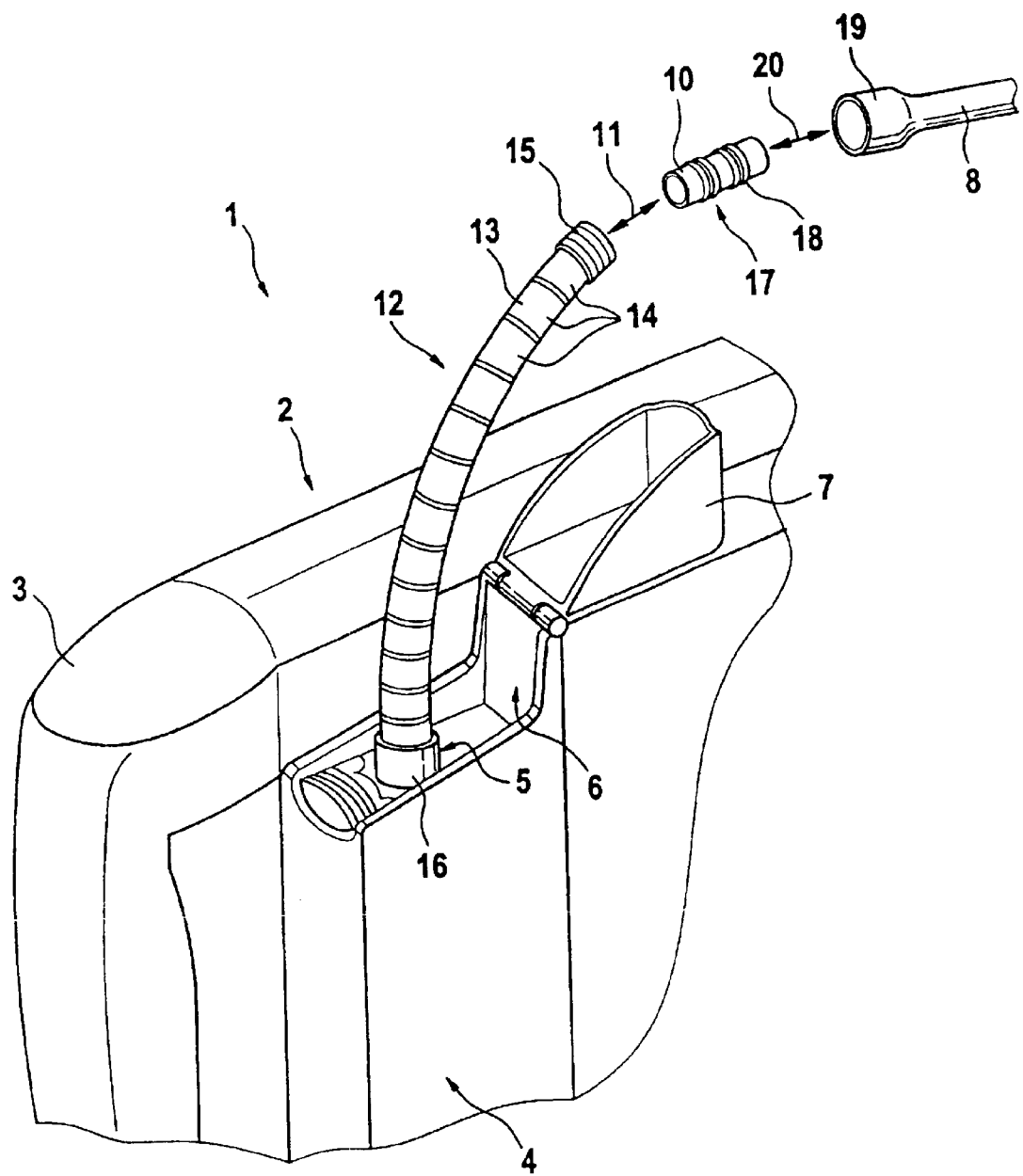

An adapter 17 shown in FIG. 4 normally comes into use here. This features a second connector element 10 that is complimentary to the first coupling element 9 as well as a first connecting link 18, which is complimentary to a second connecting link 19, which is attached to the cable 8. The attachment and detachment of this optical coupling is symbolized with an arrow 20 in FIG. 4. For each common variant of the second connecting link 19 on the side of the cable, an accompanying adapter 17 is included in order to realize an optical coupling between the cable 8 and the connector 5. Given that the invention essentially functions even without the adapter 17, the latter is omitted from FIG. 2 for reasons of simplicity. However, the recommended embodiment is with the adapter 17 as shown in FIG. 4.

Figure 3:
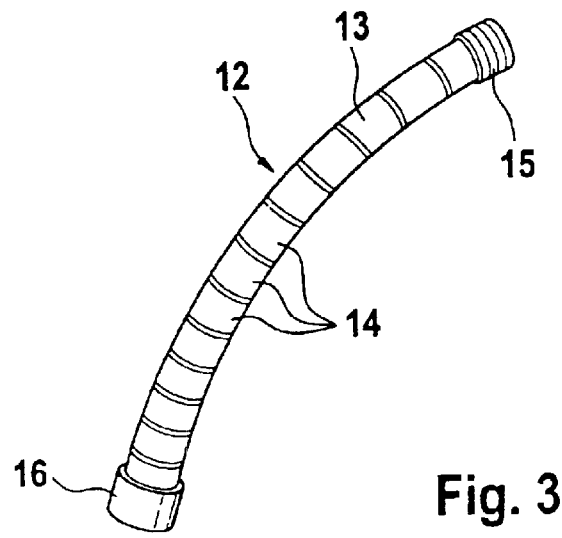

Depending on the application, the connector 5 arranged at the rear side of the device 1 cannot be reached easily by the user of the device 1. However, in order to facilitate the optical coupling of the cable 8 with the connector 5, a connection element 12 according to the invention is included as seen in FIG. 3. The connection element 12 has a tubular body 13, which is reversibly and three-dimensionally flexible. This particular property of the connection element 12 may be attained through a suitable choice of material and/or structure or configuration of the body 13. The body 13 has a multitude of links 14, which are strung together and can move relative to each other, from which the connection element 12 obtains its flexibility. The body 13 can also be built using a helically coiled band, the adjacent edges of which act in combination to produce the desired flexibility. An embodiment is thus preferred, wherein the three-dimensional form set through flexing is essentially maintained until another one is set with the same method. The flexibility of the connection elements 12 is constructively limited in order to keep to a minimum the transmission losses in the optical cable. Similar configurations are well known in other technical areas, such that no detailed explanation is necessary.

The connection element 12 shown as a separate component in FIG. 3 is fitted with the first connector element 15 at one end and with the second coupling element 16 at the other. The first connector element 15 of the connection element 12 is complimentary to the second connector element 10 of the cable 8, thus essentially identical to the first coupling element 9 of the connector 5, such that an optical coupling is attachable between the cable 8 and the connection element 12. The second coupling element 16 of the connection element 12 is complimentary to the first coupling element 9 of the connector 5, thus essentially identical to the second connector element 10 of the cable 8, such that an optical coupling is also attachable between the connector 5 and the connection element 12. The connection element 12 can thus be installed between the connector 5 and cable 8, wherein the connection element 12 contains an optical conductor not seen here, which optically connects the first connector element 15 to the second coupling element 16.

The adapter 17 shown in FIG. 4 is omitted in FIG. 3 for reasons of simplicity. This is normally installed between the connection element 12 and the cable 8 in order to be able to connect the standardized connector 5 on the side of the device to the standardized second connecting link 19 on the side of the cable.

According to FIG. 4, the connection element 12 is connected to the connector 5 in order to improve the device's 1 ease of handling. The three-dimensional flexibility of the connection element 12 allows virtually any three-dimensional orientation or positioning of the first connector elements 15 on the free end of the connection elements 12. Through this, the first connector element 15 can be normally positioned by the user such that the optical coupling with the cable 8 is relatively simple to attach and detach. In FIG. 4, the coupling and uncoupling of the cable 8 can be carried out above the device 1. The connection element 12 can also be bent such that it reaches over and/or around the side or above the casing 2 in order to position the first connector element 15 towards the front side of the device 1 such that the first connector element 15 is accessible in an easy manner, in particular from the front. In the connection element 12, which is built onto or attached to the connector 5, the conductor contained inside the connection element 12 connects the first connector element 15 with the connector 5.

In the examples given for embodiments, the connection element 12 is displayed and described as a separate component that is inserted as a connecting piece in the coupling between the cable 8 and the connector 5. To accommodate the separate, or separable, connection element 12, a stowage box not seen here can be included on or in the casing 2 to store the unused connection element 12.

An embodiment is also possible wherein the connection element 12 is securely fitted to the connector 5. Through a further configuration, it is also possible for the connection element 12 to be stowed away into the casing 2. For example, FIG. 1 could show a view of the connection element 12 stowed away into the casing 2, wherein the connector 5 corresponds with the first connector element 15.

In the embodiment shown in FIG. 4, the above-mentioned adapter 17 is inserted for the optical coupling of the cable 8 with the connector 5 between the connection element 12 and the cable 8. In this embodiment, the adapter 17 supports the second connector element 10, which is complimentary to the first connector element 15. The adapter 17 is selected in each case such that the first connecting link 18 attached to it is fitted complimentary to the respective second connecting link 19, which is attached to the respective cable 8 connected to the connector 5. In this way, the connection element 12 may be used for numerous different cables 8, which are distinguishable from the attached second connecting link 19. Alternatively, the connection element 12 can be configured such that it has this exact same adapter function, where a suitable embodiment for the connection element 12 must be made for each cable variation.

What is claimed is:

1. A device for measuring or checking components of optical networks, the device having an optical port, the optical port through which an optical line with a measuring and/or test equipment is optically connectable, the device comprising a first connector element, said first connector element for accommodating a complementary second connector element, said complementary second connector element being attachable to an optical coupling, wherein the first connector element is connected to a first end of a tube-shaped connection element, said tube-shaped connection element being connected to the optical port with a second end, said second end being opposite said first end, said tube-shaped connection element being reversibly three-dimensional bendable.

2. A device according to claim 1, wherein the connection element is built the way that it essentially maintains a three-dimensional spatial form adjusted by a reversible bend.

3. A device according to claim 1, wherein the connection element is retractable positioned on the device.

4. A device according to one of the claims 1, wherein the connection element is firmly connected with the port.

5. A device according to claim 1, wherein the connection element is detachable fastened to the port with a coupling agent.

6. A device according to claim 5, wherein the coupling agent on the port features a first coupling element, which is designed similarly, like the first connector element at the connection element, wherein the coupling agents feature a second coupling element at an end turned away from the first connector element, which is designed similarly, like the second connector element at the line.

7. A device according to claim 5, wherein the device features a stowage box, which serves for the receptacle of the detached connection element from the port.

8. A device according to claim 1, wherein the adapter, featured with a second connector element, additionally features a first connector link, which is complementary and detachable connected to the featured second connector link of the line.

9. A device according to claim 1, wherein the device is designed as an electrical time domain reflectometer or encompasses said electrical time domain reflectometer.

10. A device according to claim 1, wherein the device is designed as an optical time domain reflectometer or encompasses said optical time domain refectometer.

11. A device according to claim 1, wherein the device is designed as a wavelength division multiplexing testing device or encompasses said wavelength division multiplexing testing device.

12. A connection element for a device for measuring or checking components of optical networks, the connection element comprising a tube shaped body, said tube shaped body being reversibly three-dimensional bendable, said tube shaped body optically connecting a first connector element at a first end of said tube shaped body and a second featured coupling element at a second end of said tube shaped body, wherein said second featured coupling element is connectable to a complementary first coupling element, said complementary first coupling element formed with an optical port of the device, and wherein said first connector element is connectable to a complementary second connector element, said complementary second connector element being located at an optical line, wherein the optical line is optically connectable with the port of the device through the connection element.

13. A connection element according to claim 12, wherein the body of the connection element is built the way, that it essentially maintains a three-dimensional spatial form adjusted by a reversible bend.

14. A connection element according to claim 12, wherein the first coupling element is designed like the first connector element, and the second coupling element is designed like the second connector element.

15. A connection element according to claim 12, wherein the second connection element of the adapter features an additional first connector link, which is complementary and detachable connected to the second featured connector link of the line.

* * * * *